US005912192A

United States Patent [19]
Kim et al.

[11] Patent Number: 5,912,192
[45] Date of Patent: Jun. 15, 1999

[54] MULTI-LAYERED SOLID COMBUSTIBLE ARTICLE AND ITS MANUFACTURE

[75] Inventors: Jong-Hyun Kim; Eun-Hee Cirlin, both of Los Angeles, Calif.

[73] Assignee: Supernova Clean World, Century City, Calif.

[21] Appl. No.: 09/143,342

[22] Filed: Aug. 28, 1998

[51] Int. Cl.$^6$ ....................................................... C10L 5/48
[52] U.S. Cl. ................................ 44/530; 44/533; 44/558; 44/560; 44/590; 44/591; 44/594; 44/598; 44/599
[58] Field of Search ............................ 44/530, 533, 558, 44/560, 590, 591, 594, 595, 598, 599

[56] References Cited

U.S. PATENT DOCUMENTS

| | | |
|---|---|---|
| 3,938,965 | 2/1976 | Pyle . |
| 3,977,947 | 8/1976 | Pyle .......................................... 201/27 |
| 3,988,121 | 10/1976 | Leveskis ...................................... 44/41 |
| 4,040,796 | 8/1977 | Vincent et al. .............................. 44/14 |
| 4,043,765 | 8/1977 | Tanner ........................................ 44/14 |
| 4,046,518 | 9/1977 | Dalzell ........................................ 44/41 |
| 4,104,034 | 8/1978 | Wu et al. .................................... 44/41 |
| 4,189,305 | 2/1980 | Clayton ....................................... 44/41 |
| 4,810,256 | 3/1989 | Fay, III ....................................... 44/14 |
| 4,832,703 | 5/1989 | Campana et al. .......................... 44/519 |
| 4,883,498 | 11/1989 | MacIsaac .................................. 44/532 |
| 5,186,721 | 2/1993 | Campana ................................... 44/519 |
| 5,573,555 | 11/1996 | Kim et al. .................................. 44/533 |
| 5,711,766 | 1/1998 | Bain ........................................... 44/530 |

*Primary Examiner*—Jerry D. Johnson
*Attorney, Agent, or Firm*—Gregory Garmong

[57] ABSTRACT

A burnable article such as a fire log or a barbecue briquette is formed of a top fire-igniting layer, a middle fire-catching layer, and a body layer. The fire-igniting layer has a composition, in weight percent, of from about 47 to about 67 percent carbonized wood, from about 22 to about 34 percent barium nitrate, from about 3 to about 11 percent sodium nitrate, from about 3 to about 11 percent starch, from about 0.25 to about 0.65 percent zeolite, and from about 0.25 to about 0.65 percent potassium alum, the total of the constituents of the fire-igniting layer being 100 percent. The fire-catching layer has a composition, in weight percent, of from about 57 to about 67 percent carbonized wood, from about 18 to about 28 percent barium nitrate, from about 3 to about 11 percent sodium nitrate, from about 4 to about 12 percent starch, from about 0.15 to about 0.35 percent zeolite, and from about 0.15 to about 0.35 percent potassium alum, the total of the constituents of the fire-catching layer being 100 percent. The body layer has a composition, in weight percent, of from about 81 to about 91 percent carbonized wood, and from about 9 to about 19 percent starch, the total of the constituents of the body layer being 100 percent. The relative amounts of the layers may be different in different articles. For example, the fire log contains a higher relative amount of the body layer than does the barbecue briquette.

13 Claims, 2 Drawing Sheets

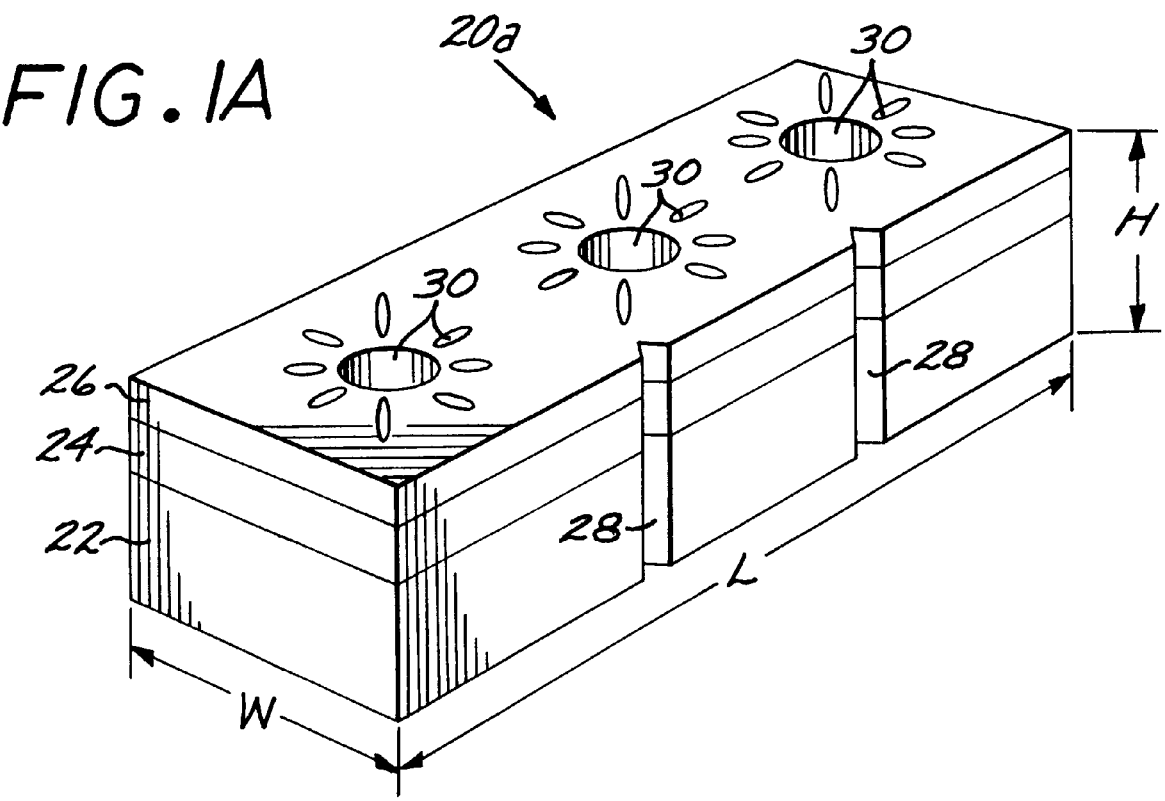
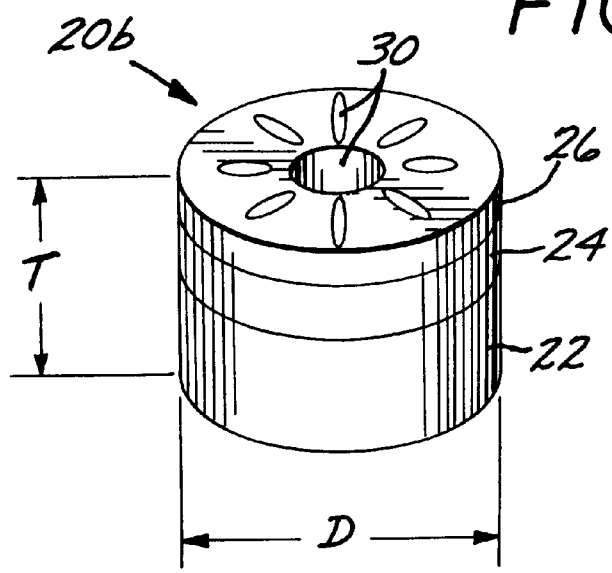

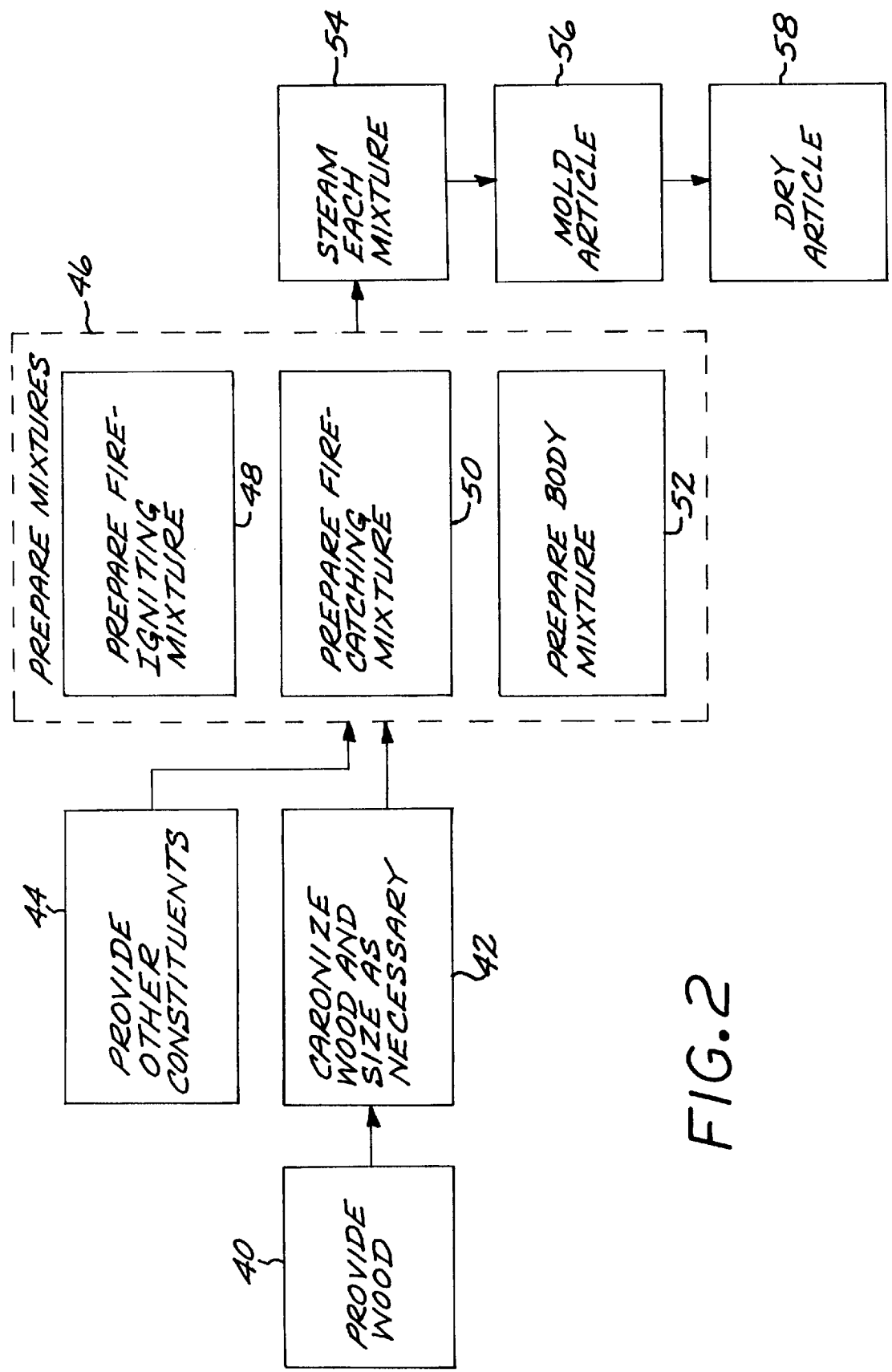

MULTI-LAYERED SOLID COMBUSTIBLE ARTICLE AND ITS MANUFACTURE

BACKGROUND OF THE INVENTION

This invention relates to a multi-layered solid combustible carbonized wood article having fast ignition without emission of carbon monoxide, and, more particularly, to fire logs, barbecue briquettes, wood fire starters, and similar articles which ignite without adding wax (in the case of artificial wax-based fire logs) or a separate starter fluid (in the case of barbecue charcoal).

It is known to make fire logs, barbecue charcoals, wood fire starters, and the like with igniting properties. Such articles may be lighted with a match rather than requiring the use of kindling (in the case of an artificial fire log with wax) or a starter fluid (in the case of barbecue charcoal). The objectives in the use of these articles differ somewhat, the objective in the case of the fire log being to produce heat and a pleasing visual appearance over a long period of time, and the objective in the case of the barbecue charcoal being to provide an intense heat for cooking, over a shorter period of time.

Some commercial wax-based artificial fire log products, for example, are formed of a molded mixture of sawdust and wax in approximately equal proportions. The wax is ignited with a match, and the burning wax in turn provides a flame to initiate and promote the burning of the sawdust. The available commercial products require 10–12 minutes to reach full flame. After the burning has reached full flame, the height of the flame decreases over the burning life of the fire log, a disadvantage because the visual appearance of the burning process is important to the consumer. There is an unpleasant odor from the burning wax, as well as heavy smoke produced when a substantial amount of the wax has been burned, which is environmentally unsound.

Various techniques have been utilized to overcome these shortcomings. Multilayer structures have been used. Such multilayer structures have a top fire-igniting layer with constituents to achieve rapid initial combustion, a fire-catching layer with constituents to sustain the initial combustion so as to catch the article on fire, and a bottom layer with the fire-sustaining fuel to generate heat over a long period of time. Depending upon the compositions of the layers, the time for the flame to propagate from the fire-igniting layer to the fire-catching layer and thence to the article may be relatively long, resulting in excessive smoke, toxic gases, and odor. There may also be the risk of uncontrolled burning, and even explosion, depending upon the constituents of the layers.

There is, accordingly, a need for an improved approach to fast, easily igniting, rapid-full-flame, clean, environmentally friendly, combustible articles such as non-wax-based artificial fire logs and barbecue briquettes that do not require the use of starter fluid. The present invention fulfills this need, and further provides related advantages.

SUMMARY OF THE INVENTION

The present invention provides a combustible article that is readily and quickly ignited, and then burns from top to bottom with a steady flame for a period of time. The combustible article reaches full flame and heating more quickly, typically within 2 minutes of ignition, than conventional fire logs, charcoals, and wood fire starters, which usually reach full flame and heating 10–12 minutes after ignition. The combustible article is largely made of carbonized wood, such as recycled or waste wood, and/or sawdust. The use of waste wood and sawdust are preferred, so that the combustible article utilizes large fractions of recycled material. No wax is used in the combustible article, which wax makes the prior artificial wax-based fire logs greasy to the touch, difficult to stack, easy to melt, and smelly to burn. The present combustible article is not greasy to the touch, may be stacked, and does not melt. There is no unpleasant odor, no toxic gas, and substantially no smoke when it is burned. The burning of the article produces low emissions, with little environmental impact, and results in an acceptably low ash content of less than 10 percent. The residual ash may be used as a fertilizer. No coal is used in the combustible articles. Unlike conventional barbecue charcoal, the present articles produce very little or no carbon monoxide during burning. The combustible article may be produced relatively inexpensively.

In accordance with the invention, a combustible article comprises a fire-igniting layer, a fire-catching layer, and a body layer. The fire-igniting layer has a composition comprising, in weight percent, from about 47 to about 67 percent carbonized wood (such as carbonized sawdust or carbonized recycled wood), from about 22 to about 34 percent barium nitrate, from about 3 to about 11 percent sodium nitrate, from about 3 to about 11 percent starch, from about 0.25 to about 0.65 percent zeolite, and from about 0.25 to about 0.65 percent potassium alum, the total of the constituents of the fire-igniting layer being 100 percent. The fire-catching layer has a composition comprising, in weight percent, from about 57 to about 67 percent carbonized wood, from about 18 to about 28 percent barium nitrate, from about 3 to about 11 percent sodium nitrate, from about 4 to about 12 percent starch, from about 0.15 to about 0.35 percent zeolite, and from about 0.15 to about 0.35 percent potassium alum, the total of the constituents of the fire-catching layer being 100 percent. The body layer has a composition comprising, in weight percent, from about 81 to about 91 percent carbonized wood, and from about 9 to about 19 percent starch, the total of the constituents of the body layer being 100 percent.

The fire-igniting layer is readily ignited by a match or other heat source. It burns rapidly and with a hot flame, igniting the fire-catching layer. The fire-catching layer burns for a longer period of time, so that the body layer is ignited. The body layer, which is primarily carbonized wood, burns for an extended period of time.

The relative amounts of the fire-igniting layer, the fire-catching layer, and the body layer may be varied according to the nature of the article. For a barbecue briquette and a fire starter, the fire-igniting layer comprises from about 10 to about 26 percent by weight of the combustible article, the fire-catching layer comprises from about 30 to about 46 percent by weight of the combustible article, and the body layer comprises from about 34 to about 54 percent by weight of the combustible article. For a fire log, the fire-igniting layer comprises from about 7 to about 13 percent by weight of the combustible article, the fire-catching layer comprises from about 13 to about 23 percent by weight of the combustible article, and the body layer comprises from about 64 to about 84 percent by weight of the combustible article. In each case, the total of the fire-igniting layer, the fire-catching layer, and the body layer is 100 percent.

The article is prepared by providing wood, preferably waste wood pieces and sawdust, and carbonizing this wood. The compositions set forth above are then prepared as separate mixtures from finely divided pieces of the carbonized wood in the indicated proportions, and steamed to provide water to aid in holding the mixtures together in the subsequent molding step. The mixtures are molded in the indicated amounts into articles using molding apparatus, with the body layer at the bottom, the fire-catching layer overlying the body layer, and the fire-igniting layer overlying the fire-catching layer. The article is thereafter dried. When the article is burned, it is preferably oriented so that the fire-igniting layer is uppermost and is first ignited. The fire then burns downwardly from the fire-igniting layer, to the fire-catching layer, and finally to the body layer.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DESCRIPTION OF THE DRAWINGS

FIGS. 1A–1B are perspective views of articles prepared according to the invention, wherein FIG. 1A is a fire log and FIG. 1B is a barbecue briquette; and FIG. 2 is a block flow diagram of a preferred method for producing the articles according to the invention.

DETAILED DESCRIPTION OF THE INVENTION

FIGS. 1A–1B illustrate two exemplary and preferred articles 20 that may be made according to the present invention, a fire log 20a in FIG. 1A and a barbecue briquette 20b in FIG. 1B. The drawings are not to scale or meant to indicate relative dimensions, which are chosen for convenience. The fire log 20a is suitable fore use in the home fireplace as well as outdoor applications. The barbecue briquette 20b is suitable for use in barbecue cooking, fire starters, and other applications. The fire log 20a is normally much larger in size than the barbecue briquette 20b. In a typical case, the fire log 20a has a length L of about 12–14 inches, a height H of about 4 inches, and a width W of about 6 inches, and weighs about 6–7 pounds. In a typical case, the barbeque briquette 20b is a disk, with a diameter D of about 5.7 inches, and a thickness T of about 1.77 inches. These sizes and shapes make the barbecue briquette easy to handle, store, and carry, unlike traditional charcoal. The shapes and dimensions of the articles are readily determined by the choice of the forming mold used in fabrication.

The perspective views of FIGS. 1A and 1B also show the structure through the fire log 20a and the barbecue briquette 20b, which structure is visible from the edges of each article. At the bottom of each article 20 is a body layer 22. Overlying the body layer 22 is a fire-catching layer 24, and overlying the fire-catching layer 24 is a fire-igniting layer 26. Although the three layers 22, 24, and 26 are illustrated as having sharp boundaries therebetween, in practice there may be some slight intermixing of the materials of the layers at their boundaries. The relative volumes of these layers 22, 24, and 26 are selected in part according to the exact type of article, and are discussed more fully subsequently. The compositions of the layers 22, 24, and 26 are also discussed more fully subsequently.

Optionally, vertical grooves 28 extending through the layers 22, 24, and 26 may be formed in the articles 20. The use of grooves 28 is more preferred for the fire log 20a and less preferred for the briquette 20b, as illustrated, although either article may be grooved or not grooved. This grooved profile aids in producing a pronounced, visually attractive flame when the article is burned, a more important consideration for the fire log 20a than for the briquette 20b.

The body layer 22 has a composition comprising, in weight percent, from about 81 to about 91 percent carbonized wood and from about 9 to about 19 percent starch, with the total of the constituents of the body layer 22 being 100 percent. As in all of the compositions stated herein, the carbonized wood is preferably finely divided carbonized wood such as carbonized sawdust or waste wood chips and pieces. Sawdust typically has an average dimension of about 0.040 inches or less, and waste wood after carbonization processing typically has an average dimension of from about 0.040 inches to about 0.4 inches. Sawdust is typically available as a waste product from lumber mills, sawmills, and wood processing plants. Waste wood is typically available as a waste product from building construction, housing construction, pallets, and furniture manufacture. Preferably, approximately equal proportions of finer pieces of carbonized wood (e.g., carbonized sawdust) and coarser pieces of carbonized wood (e.g., carbonized waste wood) are used in each of the layers; that is, about 30 to about 70 percent of the total carbonized wood in each of the layers 22, 24, and 26 is the finer-sized carbonized wood (average dimension less than about 0.040 inches), with the balance of the carbonized wood being the coarser-sized carbonized wood (average dimension of from about 0.040 inches to about 0.4 inches).

The carbonization of the wood may be accomplished by any operable method such as underground heating or an incineration apparatus. In the currently preferred approach, the carbonized wood is prepared by underground upward heating of the sawdust and/or other wood in a deficiency of oxygen so that it does not burn or turn to ash, and instead carbonizes. The wood may be larger than the preferred 0.4 inches average dimension prior to and during carbonizing, and broken or crushed into smaller pieces after carbonizing. The carbonized wood is readily broken into smaller pieces. The carbonized wood in the body layer 22 is the primary fuel for long-term (i.e., several hours) burning of the article. The starch used in the body layer 22 and the other layers 24 and 26 may be of any operable type, such as, for example, wheat flour starch, other flour starch, corn starch, potato starch, and sweet potato starch. The function of the starch is to bind the other constituents, in this case the finely divided carbonized wood, together during the molding of the articles. If too little starch is used, the article cannot be readily molded and tends to fall apart during the molding; if too much starch is used, there is too much ash resulting from the burning and the flame is weak.

The fire-catching layer 24 has a composition comprising, in weight percent, from about 57 to about 67 percent carbonized wood, from about 18 to about 28 percent barium nitrate, from about 3 to about 11 percent sodium nitrate, from about 4 to about 12 percent starch, from about 0.15 to about 0.35 percent zeolite, and from about 0.15 to about 0.35 percent potassium alum, the total of the constituents of the fire-catching layer being 100 percent. (Potassium alum has a composition of $K_2SO_4:Al_2(SO_4)_3 \cdot 24\ H_2O$.) The carbonized wood is the primary fuel in the intermediate time period from ignition until the carbonized wood of the body layer begins to combust. The function of the barium nitrate is to serve as a good oxidant that is easily ignitable and generates a flame when ignited. If too little barium nitrate is used, ignition is not sufficiently fast and easy; if too much barium nitrate is used, the initial flame is too large, the initial ignition may be dangerous because of the high flame, and the article is more expensive. The function of the sodium nitrate is to sustain the ignition started by the barium nitrate. If too little sodium nitrate is used, the initial flame does not ignite sufficiently rapidly and is not sustained for a sufficient period of time; if too much sodium nitrate is used, the flame is too large and combustion is too fast, the ignition may be dangerous because of the high flame, and the article is more expensive. The function of the starch is to bind the other constituents together during molding. If too little starch is used, the article cannot be readily molded and tends to fall apart during the molding; if too much starch is used, there is too much ash resulting from the burning and the flame is weak. The function of the zeolite and the alum is to absorb noxious gas and odors. If too little zeolite and alum are used, the burning of the article results in noxious gas and odors; if too much zeolite and alum are used, the excess is wasted and the article is more expensive.

The fire-igniting layer 26 has a composition comprising, in weight percent, from about 47 to about 67 percent carbonized wood, from about 22 to about 34 percent barium nitrate, from about 3 to about 11 percent sodium nitrate, from about 3 to about 11 percent starch, from about 0.25 to about 0.65 percent zeolite, and from about 0.25 to about 0.65 percent potassium alum, with the total of the constituents of the fire-igniting layer being 100 percent. The functions of the constituents are as discussed previously for the fire-catching layer 24, but a higher percentage of barium nitrate is used in the fire-igniting layer 26 to achieve a faster initial burning.

Any non-zero ratios of the body layer 22, the fire-catching layer 24, and the fire-igniting layer 26 are operable to start and sustain a fire. However, for optimum performance, the relative amounts of the body layer 22, the fire-catching layer 24, and the fire-igniting layer 26 are preferably selected according to the type of article. Generally, the longer the article desirably burns during service, the relatively thicker is the body layer 22. That is, a fire log 20a typically has a higher fraction of its weight in the body layer 22, than does a briquette 20b.

For a fire log 20a, the fire-igniting layer 26 preferably comprises from about 7 to about 13 percent by weight of the combustible article, the fire-catching layer 24 comprises from about 13 to about 23 percent by weight of the combustible article, and the body layer 22 comprises from about 64 to about 84 percent by weight of the combustible article, the total of the fire-igniting layer, the fire-catching layer, and the body layer being 100 percent. For a barbecue briquette 20b, the fire-igniting layer 26 preferably comprises from about 10 to about 26 percent by weight of the combustible article, the fire-catching layer 24 comprises from about 30 to about 46 percent by weight of the combustible article, and the body layer 22 comprises from about 34 to about 54 percent by weight of the combustible article, the total of the fire-igniting layer, the fire-catching layer, and the body layer being 100 percent.

FIG. 2 depicts a preferred approach for preparing articles according to the invention. Wood is provided, numeral 40. The wood is preferably sawdust, chips, or other waste products, but may be larger pieces than desired in the final carbonized wood. The wood is carbonized, numeral 42, by any operable method. One example of a procedure for carbonization of wood is disclosed in U.S. Pat. No. 3,977,947. In a more traditional approach, wood is carbonized by burying it in the earth and slowly heating it from below in a deficiency of oxygen for about 20–30 hours at a temperature sufficient to evolve hydrogen, oxygen, nitrogen, and other gaseous elements from the wood but not to burn the wood to ash. If necessary, the carbonized wood is thereafter sized. That is, the carbonized wood may be passed through appropriate screens to define the fractions in the finer-size range and the coarser-size ranges, as discussed above. If the pieces are to large to meet the screen ranges, they may easily be crushed or broken into smaller pieces and resized, until all of the carbonized wood meets the size requirements.

Other constituents are provided as discussed above (i.e., barium nitrate, sodium nitrate, starch, zeolite, and potassium alum, as appropriate for each layer), numeral 44.

The mixtures are prepared from the carbonized wood and the other constituents according to the compositions discussed above. Specifically, the fire-igniting mixture is prepared, numeral 48, the fire-catching mixture is prepared, numeral 50, and the body layer mixture is prepared, numeral 52. These mixtures are substantially dry mixtures, and are readily mixed using conventional dry mixing techniques.

Each mixture is contacted with steam, numeral 54, to provide a sufficient amount of water to promote some cohesion of the mixture for the subsequent molding. A preferred steaming procedure is upward steaming from the bottom of the mass. To effect the upward steaming, the mixtures are placed into individual containers with holes and/or meshes in the bottoms and sides, and steam is passed upwardly through the holes and/or meshes to ensure the maximum exposure of the mixture to the steam. Water from the steam is deposited onto the elements of the mixture.

The steamed mixtures are molded to a desired form, such as those shown in FIGS. 1A and 1B. Molding may be accomplished by any desired approach, such as piece-by-piece molding, extruding, etc. The steamed mixtures are molded as three layers 22, 24, and 26, as illustrated in FIGS. 1A and 1B. Typically, the body layer 22 is first molded, the fire-catching layer 24 is molded overlying the body layer 22, and the fire-igniting layer 26 is molded overlying the fire-catching layer 24. If grooves 28 are to be used in the articles, they are defined at this stage by the shape of the mold. Optionally, the articles may be provided with air holes 30 during the molding, which are retained in the final articles 20, to aid in the drying and the burning of the articles by allowing air to reach the interior of the articles. The air holes 30 preferably extend vertically through the thickness of the article 20 and the three layers 22, 24, and 26.

The article is dried, numeral 58. Drying is preferably accomplished by a forced stream of hot air at a temperature of about 70–105° C., for a time of from about 17 to about 27 hours.

Prototype fire logs of the type shown in FIG. 1A, and made according to the compositions and procedures discussed above, were prepared. These fire logs had dimensions L of 13 inches, W of 5.5 inches, and H of 3.5 inches, and weighed about 4.6 pounds each. These fire logs ignited instantly and reached full flame within two minutes of ignition. The fire logs burned with a constant, full flame for about 70 minutes, and continued to burn for another 10 minutes while still red and hot. Longer-burning fire logs, which burn for 2–3 hours, are easily prepared by making them larger in size.

Barbecue briquettes of the type shown in FIG. 1B, and made according to the compositions and procedures discussed above, were prepared. These briquettes ignited instantly by match and were ready to allow cooking within two minutes of ignition.

Three specimens of the barbecue briquettes were tested according to standard testing procedures (Southern California Air Quality Management District Rule 1174, except that Method 25.1 was not performed) to determine whether they meet stringent air quality burning standards. The results of the testing are set forth in the following table, along with the legal limit for each test result:

|  | Briquette 1 | Briquette 2 | Briquette 3 | Legal Limit |
| --- | --- | --- | --- | --- |
| pounds VOC/Start | 0.0058 | 0.0051 | 0.0060 | <0.020 |
| Final Percent Ash | 100 | 100 | 100 | >70 |
| Final 4.5" Temperature, °F. | 350.4 | 353.9 | 331.9 | >225 |

The barbecue briquettes exceeded all of the legal standards for emissions by substantial margins.

When the articles 20 are burned by a consumer, they are desirably oriented with the body layer 22 facing downwardly, the fire-igniting layer 26 facing upwardly, and the air holes 30, if any, oriented vertically, as shown in FIGS. 1A and 1B. The upwardly facing fire-igniting layer is ignited, as with a match. The article is therefore "downburning" from top to bottom of the article, with the combustion initiating at the top of the article and burning downwardly through the article over time. This downburning feature extends the burning lifetime of the article and conserves thermal energy within the article, as compared with burning in the inverted position.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A burnable article, comprising:
   a fire-igniting layer, the fire-igniting layer having a composition comprising, in weight percent, from about 47 to about 67 percent carbonized wood, from about 22 to about 34 percent barium nitrate, from about 3 to about 11 percent sodium nitrate, from about 3 to about 11 percent starch, from about 0.25 to about 0.65 percent zeolite, and from about 0.25 to about 0.65 percent potassium alum, the total of the constituents of the fire-igniting layer being 100 percent;
   a fire-catching layer, the fire-catching layer having a composition comprising, in weight percent, from about 57 to about 67 percent carbonized wood, from about 18 to about 28 percent barium nitrate, from about 3 to about 11 percent sodium nitrate, from about 4 to about 12 percent starch, from about 0.15 to about 0.35 percent zeolite, and from about 0.15 to about 0.35 percent potassium alum, the total of the constituents of the fire-catching layer being 100 percent; and
   a body layer, the body layer having a composition comprising, in weight percent, from about 81 to about 91 percent carbonized wood, and from about 9 to about 19 percent starch, the total of the constituents of the body layer being 100 percent.

2. The burnable article of claim 1, wherein the fire-igniting layer comprises from about 7 to about 13 percent by weight of the combustible article, the fire-catching layer comprises from about 13 to about 23 percent by weight of the combustible article, and the body layer comprises from about 64 to about 84 percent by weight of the combustible article, the total of the fire-igniting layer, the fire-catching layer, and the body layer being 100 percent.

3. The burnable article of claim 1, wherein the fire-igniting layer comprises from about 10 to about 26 percent by weight of the combustible article, the fire-catching layer comprises from about 30 to about 46 percent by weight of the combustible article, and the body layer comprises from about 34 to about 54 percent by weight of the combustible article, the total of the fire-igniting layer, the fire-catching layer, and the body layer being 100 percent.

4. The burnable article of claim 1, wherein the carbonized wood includes carbonized sawdust.

5. The burnable article of claim 1, wherein the carbonized wood includes carbonized waste wood.

6. The burnable article of claim 1, wherein the article has air holes extending therethrough.

7. The burnable article of claim 1, wherein the article has at least one groove in a side thereof.

8. A method for preparing a burnable article comprising the steps of providing wood;
   carbonizing the wood;
   sizing the carbonized wood as necessary;
   preparing a fire-igniting layer mixture, the fire-igniting layer mixture having a composition comprising, in weight percent, from about 47 to about 67 percent carbonized wood, from about 22 to about 34 percent barium nitrate, from about 3 to about 11 percent sodium nitrate, from about 3 to about 11 percent starch, from about 0.25 to about 0.65 percent zeolite, and from about 0.25 to about 0.65 percent potassium alum, the total of the constituents of the fire-igniting layer being 100 percent;
   preparing a fire-catching layer mixture, the fire-catching layer mixture having a composition comprising, in weight percent, from about 57 to about 67 percent carbonized wood, from about 18 to about 28 percent barium nitrate, from about 3 to about 11 percent sodium nitrate, from about 4 to about 12 percent starch, from about 0.15 to about 0.35 percent zeolite, and from about 0.15 to about 0.35 percent potassium alum, the total of the constituents of the fire-catching layer being 100 percent; and
   preparing a body layer mixture, the body layer mixture having a composition comprising, in weight percent, from about 81 to about 91 percent carbonized wood, and from about 9 to about 19 percent starch, the total of the constituents of the body layer being 100 percent;
   steaming each of the mixtures;
   molding portions of the fire-igniting mixture, the fire-catching layer mixture, and the body layer mixture into an article having the body layer mixture, the fire-catching layer mixture as a layer overlying the body layer mixture, and the fire-igniting mixture as a layer overlying the fire-catching layer mixture; and
   drying the article formed in the step of molding.

9. The method of claim 8, wherein the fire-igniting layer comprises from about 7 to about 13 percent by weight of the combustible article, the fire-catching layer comprises from about 13 to about 23 percent by weight of the combustible article, and the body layer comprises from about 64 to about 84 percent by weight of the combustible article, the total of the fire-igniting layer, the fire-catching layer, and the body layer being 100 percent.

10. The method of claim 8, wherein the fire-igniting layer comprises from about 10 to about 26 percent by weight of the combustible article, the fire-catching layer comprises from about 30 to about 46 percent by weight of the combustible article, and the body layer comprises from about 34 to about 54 percent by weight of the combustible article, the total of the fire-igniting layer, the fire-catching layer, and the body layer being 100 percent.

11. The method of claim 8, wherein the carbonized wood includes carbonized sawdust.

12. The method of claim 8, wherein the article has air holes extending therethrough.

13. The method of claim 8, wherein the article has at least one groove in a side thereof.

\* \* \* \* \*